United States Patent [19]

Georgelos et al.

[11] Patent Number: 5,397,640
[45] Date of Patent: Mar. 14, 1995

[54] BIAXIALLY ORIENTED HEAT-SHRINKABLE FILM

[75] Inventors: Paul N. Georgelos, Oak Park, Ill.; James E. Pelkie, Centerville, Iowa; Darrel L. Wilhoit, Plainfield, Ill.

[73] Assignee: Viskase Corporation, Chicago, Ill.

[21] Appl. No.: 189,370

[22] Filed: Jan. 31, 1994

Related U.S. Application Data

[63] Continuation-in-part of Ser. No. 855,826, Mar. 23, 1992, Pat. No. 5,283,128.

[51] Int. Cl.$^6$ .............................................. B32B 7/12
[52] U.S. Cl. .................................. 428/349; 428/34.9; 428/516; 428/910; 525/240; 264/290.2
[58] Field of Search ............. 428/349, 516, 910, 34.9; 525/240; 264/290.2

[56] References Cited

U.S. PATENT DOCUMENTS 4,952,451  8/1990  Mueller .............................. 428/218

FOREIGN PATENT DOCUMENTS 436196  7/1991  European Pat. Off. .

OTHER PUBLICATIONS

Products from EXXPOL TM Technology "EXACT TM 3027", Exxon Chemical.

*Primary Examiner*—Edith Buffalow
*Attorney, Agent, or Firm*—D. Bobrowicz; J. C. LeFever

[57] ABSTRACT

An improved biaxially oriented heat-shrinkable film of the type used for packaging food, such as poultry, processed meat, and fresh meat.

16 Claims, No Drawings

BIAXIALLY ORIENTED HEAT-SHRINKABLE FILM

RELATED APPLICATION

This application is a continuation-in-part of application Ser. No. 07/855,826, filed Mar. 23, 1992, in the name of Darrel L. Wilhoit and issued Feb. 1, 1994, as U.S. Pat. No. 5,283,128.

FIELD OF THE INVENTION

This invention relates to an improved biaxially oriented heat-shrinkable film of the type used for packaging food such as poultry, processed meat and fresh red meat.

BACKGROUND OF THE INVENTION

Biaxially oriented heat-shrinkable films of the monolayer type are used in the packaging of poultry. Biaxially oriented heat-shrinkable films of the multilayer type having an oxygen barrier core layer are used in the packaging of processed meat and fresh red meat. As generally understood, a "heat-shrinkable" film tends to return to its original unstretched (unextended) dimension when heated to its softening point. The terms "orientation" or "oriented" are used to describe the manufacture of heat-shrinkable films, wherein resin material is heated above its flow or melting point and extruded through a die into either tubular or sheet form. After cooling, the relatively thick extrudate is reheated to a temperature range suitable to orient or align the crystallites and/or molecules of the material. The orientation temperature range for a given material or materials is understood by those skilled in the art to be in a range which revises the inter-molecular configuration of the material by physical alignment of the crystallites and/or molecules of the material to improve certain mechanical properties of the film such as shrink. When the stretching force is applied in one direction, uniaxial orientation results. When the stretching force is simultaneously applied in two directions, biaxial orientation results.

A commercially used thermoplastic material in the manufacture of biaxially oriented heat-shrinkable films is ethylene vinyl acetate (EVA). This material in the thin film form (e.g. 2.5 mils) is characterized by high shrink properties, for example at least 35% shrink in both the machine (MD) and transverse directions (TD).

Biaxially oriented heat-shrinkable films containing EVA are commonly produced by extruding a primary tube, cooling, and then reheating and expanding the primary tube both longitudinally and transversely by means of different nip roll speeds in the longitudinal direction and air inflation in the transverse direction. One such process is described in the U.S. Pat. No, 3,456,044. This two-step process is often referred to as the double-bubble or the trapped bubble process. When a multilayer film is desired the multiple layers may be coextruded, as for example with an oxygen-barrier core layer and first and second outer layers on each side of the core layer to form the aforementioned primary tube. As for example described in Canadian Patent No. 982,923, these outer layers may comprise EVA and the core layer may comprise a vinylidene chloride copolymer with a comonomer such as vinyl chloride or methyl acrylate. Another commonly used oxygen barrier material is ethylene vinyl alcohol, i.e. EVOH. Instead of coextrusion the primary tube may be formed by coating lamination, wherein a first outer layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in U.S. Pat. No. 3,741,253. As still another alternative, a multiple layer film may be formed as a sheet by the well-known slot casting procedure, and then biaxially oriented into a heat-shrinkable film, for example by tentering.

One limitation of EVA-based biaxially oriented heat-shrinkable film is that the plastic orientation strength of EVA films is relatively low compared with certain other thermoplastic materials as for example polyethylene. Because of its molecular structure, EVA has relatively low strength in the primary tube form when reheated to orientation temperatures as for example 68°–84° C. As a result, EVA based biaxially oriented heat-shrinkable film is subject to bubble breaks and process interruptions, which can result in a relatively high waste rate.

Certain polyethylenes may be used to manufacture biaxially oriented heat-shrinkable films, and their plastic orientation strength is substantially higher than EVA. Unfortunately their heat shrink properties are inferior to EVA. By far the best heat shrink properties in the polyethylene family are achieved with very low density polyethylene (VLDPE). Although the heat shrink properties of VLDPE approach those of EVA, there is a significant difference and loss of shrink if VLDPE is substituted for EVA in the production of biaxially oriented heat-shrinkable films to achieve higher plastic orientation strength. Moreover it has been determined that the shrink and plastic orientation properties of EVA and VLDPE blends are approximately linear. That is, the shrink and plastic orientation properties of biaxially oriented heat-shrinkable films comprising 50% EVA–50% VLDPE are approximately midway between those of the pure components.

In the aforereferenced Wilhoit parent application, a biaxially oriented heat-shrinkable film is described and claimed, containing EVA and VLDPE or LLDPE (linear low density polyethylene) and having shrink properties similar to those of a pure EVA film, but also the improved plastic orientation properties of a pure VLDPE film. Use of EVA and VLDPE in such film is desirable because both are available from several manufacturers as relatively low cost resins. This Wilhoit film comprises a blend of a polyethylene member selected from the group consisting of VLDPE and LLDPE or a mixture thereof, ethylene alpha-olefin plastomer copolymer of density below about 0.90 g/cm$^3$ and EVA as major components. The term "ethylene alpha-olefin plastomer" is described further hereinbelow. As between the polyethylene and EVA, polyethylene comprises between about 40 and about 65% of the total. The ethylene alpha-olefin plastomer copolymer comprises between about 10 and about 20 wt. % of the total weight of the three component blend.

Notwithstanding the improvement in the art afforded by this Wilhoit invention, even further improvements are desired. For example, in certain end uses such as packaging of processed meats, there is a desire for thermoplastic films with higher biaxial shrink level than achievable with pure EVA. Another need for processed meat packaging is a biaxially oriented heat-shrinkable film with improved optical properties, i.e. high gloss and lower haze. A further desire is to provide such a thermoplastic film with improved hot water seal strength.

Two component blends of relatively high concentration VLDPE and relatively low EVA concentration provide reasonably good shrink and very good hot water seal strength, but relatively poor optical properties for processed meat packaging. Two component blends of relatively high EVA concentration and relatively low plastomer concentration (of the type employed in the Wilhoit invention) likewise do not provide particularly good optical properties. Moreover, three component blends where each component is present in substantial concentration in general do not provide good optical properties. This is typically due to compatibility differences between the three components.

U.S. Pat. No. 5,1272,016 discloses a biaxially oriented heat shrinkable multilayer stretch film, useful as a trayed poultry overwrap, comprising two outer layers and a core layer. The outer layers each comprise a blend of 20–35 wt. % ethylene alpha-olefin plastomer and 65–80 wt. % VLDPE of density between 0,912 and 0,914 g/cm$^3$. These films are suitable for the intended application, but in general do not provide sufficiently high gloss % for processed meat packaging, or the higher shrink % desired for the same end use. In addition their hot water seal strength would not be sufficiently high for processed meat packaging.

An object of this invention is to provide a biaxially oriented heat-shrinkable film of the EVA-VLDPE type, having higher biaxial heat shrink, better optical properties and improved hot water seal strength than heretofore achieved.

Other objects and advantages of this invention will be apparent from the ensuing disclosure and appended claims.

As will be explained and demonstrated hereinafter, the biaxially oriented heat-shrinkable film of the present invention provides all of the advantages of the aforedescribed Wilhoit invention, but in addition provides at least three additional improvements over the EVA-VLDPE blend-type film, i.e. higher shrink, better optical properties and better hot water seal strength.

It has been unexpectedly discovered that if VLDPE, EVA and ethylene alpha-olefin plastomer are blended in selected concentration ranges, each of these three improvements may be realized. This is particularly surprising because each of the aforementioned constituents is present in a substantial concentration, yet the resulting film has superior optical properties to two component blends of the same constituents, along with improved shrink and hot water seal strength.

More particularly, one aspect of this invention relates to a biaxially oriented heat-shrinkable film comprising a three component blend of very low density polyethylene (VLDPE), ethylene vinyl acetate (EVA) and ethylene alpha-olefin plastomer copolymer of density below about 0.90 g/cm$^3$ as major components. The VLDPE comprises between about 24 and about 38 wt. %, the EVA comprises between about 28 and about 40 wt. %, and the plastomer comprises between about 33 and about 43 wt. % of the three component blend.

The aforedescribed film may be a monolayer wherein the three component blend comprises the entire film. Alternatively this film may comprise one or more layers of a multilayer film. By way of example, the three component blend may comprise either or both the first and second outer layers on either side of a three layer film wherein the core layer between these layers is an oxygen barrier material.

Another aspect of this invention relates to a method for manufacturing a biaxially oriented heat-shrinkable plastic film wherein a primary tube is extruded, cooled, reheated and stretched in the machine direction and inflated in the transverse direction by internal gas to form a bubble, then collapsed and withdrawn as biaxially oriented heat shrinkable film. The improvement comprises forming the primary tube from a three component blend of major constituents comprising: VLDPE, EVA and ethylene alpha-olefin plastomer copolymer of density below about 0.90 g/cm$^3$. The VLDPE comprises between about 24 and about 38 wt. %, the EVA comprises between about 28 and about 40 wt. %, and the plastomer comprises between about 33 and about 45 wt. % of the three component blend.

DETAILED DESCRIPTION OF THE INVENTION

Very low density polyethylene (hereinafter VLDPE) is also called ultra low density polyethylene (ULDPE) and comprises copolymers of ethylene with alpha-olefins, usually 1-butene, 1-hexene or 1-octene, and in some instances terpolymers, as for example of ethylene, 1-butene and 1-octene. As used herein VLDPE also includes terpolymers of ethylene and higher alpha-olefin comonomers. VLDPE's have lower densities than, and are a different class of materials from linear low density polyethylene (LLDPE) and are recognized by those skilled in the art to range between about 0.86 and about 0.914 g/cm$^3$. A process for making certain VLDPE's is described in European Patent Document publication number 120,503 whose text and drawing are hereby incorporated by reference into the present document. As described therein these particular VLDPEs are made by using the traditional Ziegler-Natta heterogeneous catalyst system.

Alternatively, VLDPEs may be prepared by a homogeneous metallocene single-site catalyst system which in general produces molecular chains of more uniform lengths with more evenly spaced comonomer. Another result is narrower molecular weight distribution and composition. If necessary, according to the resin manufacturers a multi-step polymerization process with a succession of different metallocene single-site catalysts is capable of producing virtually any desired final molecular weight distribution. Based on information published by the manufacturers it appears that Exxon Chemical Company's EXACT® type ethylene alpha olefin and Dow Chemical Company's AFFINITY® type ethylene alpha olefin are prepared in metallocene single-site catalyst systems. This general type of system is described in Welborn U.S. Pat. No. 5,183,867 (assigned to Exxon) and European Patent Application Publication 0 416 815 A2 to G. F. Schmidt (assigned to Dow), both incorporated to the extent pertinent. As explained hereinafter in more detail, certain ethylene alpha olefin plastomers manufactured by Dow and Exxon are also manufactured with metallocene single-site catalyst systems.

As for example described in U.S. Pat. Nos. 4,640,856 and 4,863,769, VLDPEs are capable of use in biaxially oriented films which have superior properties to comparable films with LLDPE's. These superior properties include higher shrink, higher tensile strength and greater puncture resistance.

VLDPE's are commercially available in dry resin form either as powder or granules, and for example manufactured and sold by Union Carbide Corporation and Dow Chemical Corporation and Exxon Chemical Company.

Ethylene alpha-olefin copolymers are also manufactured with elastomeric properties and are hereinafter referred to as "ethylene alpha-olefin plastomers". Some of these have densities in the same range as VLDPE's, but have greatly different physical properties due to differences in manufacturing processes. One manufacturer of these materials is Mitsui Petrochemicals Ltd., and they sell ethylene-butene plastomer copolymers under the name "Tafmer". It is interesting to note that Mitsui manufactures and sells both ethylene alpha-olefin plastomers and materials they characterize as VLDPE's, and the two types of materials are manufactured in different plants using different catalyst systems. Mitsui describes the differences between the two types of ethylene alpha-olefin copolymers in the "Proceedings of Future-Pak '91, Ninth International Ryder Conference on Food Packaging Innovations", Oct. 2–4, 1991. As used herein, ethylene alpha-olefin plastomers include terpolymers of ethylene and higher alpha-olefin comonomers. According to U.S. Pat. No. 4,469,753 Tafmers are copolymers of butene-1.

Although it appears that the Tafmer-type plastomers are prepared using the Ziegler-Natta heterogeneous catalyst systems, other ethylene alpha-olefin plastomers are manufactured using homogeneous metallocene single-site catalyst systems as previously described. These include certain of Dow's AFFINITY materials and certain of Exxon's EXACT materials.

The following is a general discussion of VLDPE and plastomer properties from several perspectives.

Crystallinity

A manufacturer of both plastomer-type ethylene alpha-olefin copolymers and VLDPE reports that in general, the plastomers have lower crystallinity than VLDPE copolymers. In particular, Mitsui Petrochemical Industries Ltd. reports that their Tafmers have lower crystallinity than their VLDPE materials (ref: "Future-Pak '91, Ninth International Ryder Conference on Food Packaging Innovations, Oct. 2–4, 1991, page 314). Mitsui also advises that for comparable density, their Tafmer-type plastomer ethylene alpha-olefin copolymer has 10–15% crystallinity whereas their VLDPE has 25–35% crystallinity.

Differential Scanning Colorimetry (DSC) is commonly used to measure the amount of crystallinity in a plastic sample, and it also reveals the nature of this crystallinity. As for example determined in a procedure similar to ASTM D-3418, a DSC is performed by exposing a sample of the plastic to a constant rate of heating, i.e. 50° C. per minute and a DuPont 9000 brand differential scanning colorimeter. When the temperature of a sample reaches the melting point of a crystalline region, the continued application of heat causes the crystalline fraction to melt, and during this process the sample temperature remains constant. After the crystalline region has melted, the sample temperature once again begins to rise.

DSC measurements were performed on two types of VLDPE's: the Union Carbide 1137 (an ethylene-butene copolymer) with 0,906 density and the Dow Attane 4001(an ethylene-octene copolymer) with 0,912 density. The same type measurement was performed with Tafmer A-1085. Each of these ethylene alpha-olefin copolymers has some crystallinity but the crystalline nature of the ethylene alpha-olefin plastomer and the VLDPE copolymers is entirely different.

The entire crystalline phase of the ethylene alpha-olefin Tafmer A-1085 plastomer melts between about 55° and 85° C., and this melting point range is consistent with the crystalline phase being made up of an ordered butene-ethylene copolymer. In contrast, the VLDPE copolymers useful in this invention have at least one crystalline phase with the dominant phase being that of a high temperature melting point, in each instance being at least about 90° C.

The melting points of representative VLDPE and plastomeric ethylene alpha-olefin copolymers useful in the practice of this invention are summarized in Table A.

TABLE A

| Ethylene Alpha-Olefin Melting Points (°C.) | |
|---|---|
| Type Compound and Manufacturer | MP (°C.) |
| Union Carbide 1137 VLDPE | 117 |
| Union Carbide 1085 VLDPE | 117 |
| Union Carbide 1092 VLDPE | 121 |
| Union Carbide 1063 VLDPE | 124 |
| Union Carbide 1064 VLDPE | 125 |
| Dow Attane 4001 VLDPE | 121 |
| Dow Attane 4003 VLDPE | 107/124 (two peaks) |
| Exxon Exact 3025 VLDPE | 103[1] |
| Exxon Exact 3034 VLDPE | 95[1] |
| Exxon Exact 3033 VLDPE | 94[1] |
| Exxon Exact 3027 VLDPE | 92[1] |
| Dow Affinity-PL 1840 VLDPE | 103 |
| Dow Affinity-PL 1845 VLDPE | 103 |
| Dow Affinity-PL 1880 VLDPE | 100 |
| Mitsui Tafmer A-4085 plastomer | 71 |
| Mitsui Tafmer A-4090 plastomer | 85 |
| Mitsui Tafmer A-1085 plastomer | 71 |
| Exxon Exact 4011 Plastomer | 66[1] |

[1]Exxon method

Table A demonstrates the substantial difference in melting points of VLDPE as compared to ethylene alpha-olefin copolymer plastomers. More particularly, ethylene alpha-olefin copolymer plastomers suitable for use in this invention have melting points below about 90° C. and VLDPE materials suitable for use in this invention have melting points above about 90° C. Preferably the plastomers have melting points below about 85° C. Preferred VLDPE copolymers for practice in this invention have a crystalline melting point between about 100° C. and about 125° C. Resins having a crystalline melting point above about 125° C. are, with rising temperature, increasingly difficult to process as biaxially oriented heat-shrinkable food packaging stretch films. For best optical properties in the film, the VLDPE in the three component preferably has a melting point of at least about 115° C. VLDPE resins useful in the outer layer blends of the inventive film preferably have a crystalline melting point between about 115° C. and about 125° C.

Vicat Softening Point

VLDPE materials tend to be less flexible and harder to penetrate than plastomer-type ethylene alpha-olefins, which tend to be more flexible and softer. This is illustrated by comparing Vicat softening points for the two kinds of copolymers. As defined in ASTM 1525, Vicat softening point is the temperature at which a flat-ended needle of 1-mm² circular cross section will penetrate a thermoplastic specimen to a depth of 1 mm. under a specified load using a selected uniform rate of temperature rise. Vicat softening points for various VLDPE materials, and plastomer-type ethylene alpha-olefins have been reported by the resin manufacturers and are summarized in Table B (Vicat Softening Points) as follows.

TABLE B

| Vicat Softening Points (°C.) | |
|---|---|
| Type Compound and Manufacturer | VSP (°C.) per ASTM-1525 |
| Union Carbide 1137 VLDPE | 80 |
| Union Carbide 1063 VLDPE | 93 |
| Union Carbide 1064 VLDPE | 90 |
| Union Carbide 1569 VLDPE | 94 |
| Dow Attane 4001 VLDPE | 95 |
| Dow Attane 4003 VLDPE | 80 |
| Dow Attane 4004 VLDPE | 92 |
| Exxon Exact 3033 VLDPE | 75–83 |
| Mitsui Tafmer A-1085 plastomer | 58 |
| Mitsui Tafmer A-4085 plastomer | 54 |
| Mitsui Tafmer A-4090 plastomer | 65 |
| Mitsui Tafmer A-20090 plastomer | 60 |
| Mitsui Tafmer A-0585 plastomer | 62 |
| Exxon Exact 4011 plastomer | 70 |

Based on the foregoing and for purposes of this invention, VLDPE-type ethylene alpha-olefin copolymers useful in the practice of this invention preferably have Vicat softening points of at least about 75° C., and most preferably between about 78° C. and about 100° C. Conversely, preferred plastomer-type ethylene alpha-olefin copolymers have Vicat softening points below about 72° C. and most preferably between about 50° C. and about 72° C.

Molecular Weight/Size Distribution

Ethylene alpha-olefin copolymers may be partially characterized by their weight average molecular weight (Mw) which is determined by multiplying the weight of each chain of a given number of repeat units by the number of such chains and dividing by the total weight of chains. Ethylene alpha-olefin copolymers may also be partially characterized by a number average molecular weight (Mn), which is derived from the total weight of polymer molecules divided by the total number of molecules. When both of these are known, they can be used to characterize the shape of the molecular weight distribution curve for the copolymer, i.e., the number of polymer chains in a molecular weight interval as the ordinate and the molecular weight as the abscissa. Qualitatively, a high Mw/Mn connotes a wide distribution of molecular weights whereas a low Mw/Mn connotes a narrow distribution. Mw/Mn can be measured by several different techniques, but as used herein the gel permeation chromatography ("GPC") procedure outlined in ASTM D-3593-80 is used.

In general, relatively narrow Mw/Mn distribution (and low ratio) as for example obtained with a homogeneous metallocene single-site catalyst system permits sharper control of physical properties and superior optical properties, i.e. relatively high gloss and low haze. However, relatively low Mw/Mn ratio value polymers are also difficult to process. More particularly, the specific ethylene alpha-olefin plastomers known to applicant as useful in this invention are characterized by relatively narrow molecular weight distribution and Mw/Mn values below about 3.

Many but not all of the specific VLDPE copolymers which are available in commercial quantities (i.e., those prepared with a Ziegler-Natta heterogeneous catalyst system) have substantially wider molecular weight distribution and higher Mw/Mn values than the ethylene alpha-olefin plastomers known to applicant as being useful in practicing this invention. However, all of the VLDPE copolymers known to applicants as being prepared with a homogeneous metallocene single-site catalyst system have Mw/Mn values below about 3 and on the order of 2. In general, the VLDPE copolymers have higher impact strength, tensile strength, abrasion resistance and better processing characteristics. For example, by themselves these VLDPEs may be melt extruded into a primary tube and then biaxially oriented into a heat-shrinkable tube. The molecular weight/size distribution ratios for representative commercially available ethylene alpha-olefin copolymers useful in the practice of this invention are set forth in the following Table C (Molecular Weight/Size Distributions). Unless indicated otherwise, these values were measured by the GPC procedure of ASTM D3593-80.

TABLE C

| Molecular Weight/Size Distributions | |
|---|---|
| Type Compound and Manufacturer | Mw/Mn |
| Union Carbide 1137 VLDPE (0.906 density, 1.0 MI) | 4.9 (125,000/25,700) |
| Union Carbide 1192 VLDPE (0.912 density, 0.19 MI) | 12.2 (196,900/16,080) |
| Union Carbide 1096-2 VLDPE (0.912 density, 0.38 MI) | 7.2 (137,000/19,110) |
| Dow 4001 VLDPE | 5.1 (110,600/21,680) |
| Mitsui 0.907 density VLDPE | 3.2* |
| Exxon Exact 3033 VLDPE | 1.8 (92,000/50,000) |
| Mitsui Tafmer A-4090 plastomer | 2.0* |
| Mitsui Tafmer A-4085 plastomer | 2.35 (108,000/46,000) |
| Mitsui Tafmer A-1085 plastomer | 2.00 (160,000/80,000) |
| Mitsui Tafmer A-0585 plastomer | 2.05 (190,000/92,600) |
| Exxon Exact 4011 plastomer | 2 (approximate) |

*Reported by manufacturer in the aforementioned "Proceedings of Future-Pak '91", page 314. Procedure for measuring Mw/Mn not identified.

Tensile Properties

In general, known VLDPE materials useful in the practice of this invention have higher tensile strengths than comparable ethylene alpha-olefin plastomers. That is, if the two types of copolymers were prepared from the same comonomer and using the same catalyst system, the VLDPE would have higher crystallinity and density, hence higher tensile strength. Mitsui, a manufacturer of both plastomers and VLDPE, reports the following values for Young's Modulus (the modulus of elasticity), which is the ratio of stress to strain below the proportional limit of a material, as summarized in Table D.

TABLE D

| Young's Modulus | |
|---|---|
| Material | Kg/cm² |
| Tafmer A-4085* | 400 |
| Tafmer A-20090* | 600 |
| VLDPE (0.907 density)** | 1820 |

*"Tafmer", publication of Mitsui Petrochemical Ind, Ltd. page 12
**"Proceedings of Future-Pak '91", page 314

Another difference in the tensile properties of ethylene alpha-olefin plastomers and VLDPE materials is that the former do not have a definitive yield point whereas VLDPE materials generally possess such a point. As defined in ASTM D-638, yield point is the first point on the stress-strain curve at which an increase in strain occurs without an increase in stress. ASTM D-638 also defines yield strength as the stress at which a material exhibits a specific limiting deviation from the proportionality of stress to strain, and unless otherwise specified, that stress will be the stress at the yield point. In the aforementioned "Future-Pak '91" publication by Mitsui, the following information is reported on page 314 for yield strengths: Tafmer A-4090 no value reported, VLDPE 0,896 density is 42 kg/cm$^2$, and VLDPE 0,907 is 84 kg/cm$^2$. This indicates that in view of a manufacturer of both ethylene alpha-olefin plastomers and VLDPE, the former do not have a yield point but instead break when sufficient stress is applied. In contrast, Mitsui indicates that its VLDPE materials have definite yield points.

The Mitsui results were qualitatively confirmed in a series of tests in which samples of various resins were prepared according to the procedure for thin plastic sheeting outlined in ASTM 882-90. The dimensions of these resin samples were as follows: 1 inch width, 4 inches long and 7–9 mils thick. These samples were tested for yield point and tensile strength following Method A, employing a constant rate of separation of the grips initially holding the ends of specimen 2 inches apart, this rate being 20 inches/minute. Five samples of each material were tested and the results averaged. The results of these tests are summarized in Table E (Yield Strength).

TABLE E

Yield Strength

| Type Compound and Manufacturer | Average Yield Strength (psi) |
| --- | --- |
| Dow Attane XU61512.21 VLDPE (0.901 density) | 1020 |
| Dow Attane XU61520.01 VLDPE (0.912 density) | 1329 |
| Union Carbide 1137 VLDPE (0.906 density) | 1121 |
| Union Carbide 1192 VLDPE (0.912 density) | 1323 |
| Mitsui Tafmer A-4085 Plastomer (0.88 density) | No yield point |
| Mitsui Tafmer A-1085 Plastomer (0.88 density) | No yield point |

Dow Chemical and Exxon Chemical report the following tensile strength at break for their Affinity and Exact ethylene alpha olefins:

TABLE F

Affinity and Exact Tensile Strengths

| Designation and Type Compound | Value (Mpa) |
| --- | --- |
| Exact 4011 plastomer (D-638) | 22 |
| Exact 3025 VLDPE (D-882) | 56 (MD) |
| | 39 (TD) |
| Exact 3034 VLDPE (D-882) | 71.9 (MD) |
| | 57.1 (TD) |
| Exact 3033 VLDPE (D-882) | 68 (MD) |
| | 62 (TD) |
| Exact 3027 VLDPE (D-882) | 56 (MD) |
| | 36 TD) |
| Exact 3033 VLDPE (D-882) | 90 (MD) |
| | 98 (TD) |
| Affinity PL 1840 VLDPE (D-882) | 55 (MD) |
| | 52.7 (TD) |
| Affinity PL 1845 VLDPE (D-882) | 45.4 (MD) |
| | 33.4 (TD) |
| Affinity PL 1880 VLDPE (D-882) | 49.4 (MD) |
| | 26.2 (TD) |

Suitable VLDPE materials for practicing this invention include certain ethylene alpha olefin polymers manufactured and sold by each of Dow Chemical Company under the names Attane and Affinity, Exxon Chemical Company under the name Exact, and Union Carbide Corporation, and having the following physical properties in the resin form according to the manufacturers, as summarized in Table G (VLDPE Physical Properties):

TABLE G

| Type | Manufacturer | Property | Units | Value |
| --- | --- | --- | --- | --- |
| | | VLDPE Physical Properties | | |
| 4001 | Dow VLDPE (ethylene-octene copolymer) | Melt Index (D-1238) | g/10 min | 1.0 |
| | | Density (D-792) | g/cc | 0.912 |
| | | Tensile Yield (D-638) | psi | 1200 |
| | | Ultimate Tensile (D-638) | psi | 3500 |
| | | Ult. Elongation (D-638) | % | 850 |
| | | Vicat Soften.Pt. (D-1525) | °C. | 95 |
| | | Mw/Mn (ASTM D-3593) | none | 5.1 (110,600/ 21,680) |
| 4003 | Dow VLDPE (ethylene-octene copolymer) | Melt Index (D-1238) | g/10 min | 0.8 |
| | | Density (D-792) | g/cc | 0.905 |
| | | Tensile Yield (D-638) | psi | 950 |
| | | Ultimate Tensile (D-638) | psi | 3200 |
| | | Ult. Elongation (D-638) | % | 800 |
| | | Vicat Soften.Pt. (D-1525) | °C. | 80 |
| 1137 | Union Carbide VLDPE (ethylene-butene copolymer) | Melt Index (D-1238) | g/10 min | 1.0 |
| | | Density (D-792) | g/cc | 0.906 |
| | | Tensile Yield (D-638) | psi | 2800 |
| | | Ultimate Tensile (D-638) | psi | — |
| | | Ult. Elongation (D-638) | % | 1720 |
| | | Vicat Soften.Pt. (D-1525) | °C. | 80 |
| | | Mw/Mn (ASTM D-3593) | none | 4.9 (125,000/ 25,700) |
| 1192 | Union Carbide VLDPE (ethylene-butene hexene terpolymer) | Melt Index (D-1238) | g/10 min | 0.19 |
| | | Density (D-792) | g/cc | 0.912 |
| | | Tensile Strength (D-882) | psi | 7100 (MD) 5000 (TD) |
| | | Ult. Elongation (D-882) | % | 400 (MD) 760 (TD) |
| | | Vicat Soften.Pt. (D-1525) | °C. | "low eighties" reported by mfg. |
| | | VLDPE Properties | | |
| | | Mw/Mn (ASTM D-3593) | none | 12.2 (196,900/ 16,08) |
| 3033 | Exxon VLDPE* | Melt Index (D-1238) | g/10 min | 1.2 |

TABLE G-continued

| Type | Manufacturer | Property | Units | Value |
|---|---|---|---|---|
| | (ethylene-butene hexene terpolymer) | Density (D-1505) | g/cc | 0.900 |
| 3027 | Exxon VLDPE* | Melt Index (D-1238) | g/10 min | 3.5 |
| | (ethylene-butene copolymer) | Density (D-792) | g/cc | 0.900 |
| 3025 | Exxon VLDPE* | Melt Index (D-1238) | g/10 min | 2.2 |
| | (ethylene-butene copolymer) | Density (D-792) | g/cc | 0.910 |
| PL 1840 | Dow VLDPE (ethylene-octene copolymer) | Melt Index (D-1238 | g/10 min. | 1.0 |
| | | Density (D-792 | | 0/908 |
| PL 1845 | Dow VLDPE (ethylene-octene copolymer) | Melt index (D-1238) | g/10 min. | 3.5 |
| | | Density (D-792) | g/cc | 0.910 |
| PL 1880 | Dow VLDPE (ethylene-octene copolymer) | Melt Index (D-1238) | g/10 min. | 1.0 |
| | | Density (D-792) | g/cc | 0.902 |

*Exxon classifies its metallocene-derived ethylene alpha olefins of at least 0.900 density as VLDPE Suitable ethylene alpha-olefin plastomer copolymers include certain of those manufactured and sold by each of Exxon Chemical Company under the name Exact, Mitsui Petrochemical Industries, Ltd. under the name Tafmer and by Dow Chemical Company under the name Affinity, and having the following physical properties in resin form according to the manufacturers, as summarized in Table H (Ethylene alpha-olefin Plastomer Properties).

TABLE H

Ethylene Alpha-Olefin Plastomer Properties

| Type | Manufacturer | Property | Units | Value |
|---|---|---|---|---|
| A-4085 | Mitsui | Melt Index (D-1238) | g/10 min (190° C.) | 3.6 |
| | | Density (D-1505) | g/cc | 0.88 |
| | | Vicat Soften Pt. (D-1525) | °C. | 54 |
| | | Tensile Strength At Break (515 K 6301) | kg/cm² | 270 |
| | | Elongation At Break (515 K 6301) | % | 800 |
| | | Mw/Mn | none | 2.35 |
| A-4090 | Mitsui | Melt Index (D-1238) | g/10 min (190° C.) | 3.6 |
| | | Density (D-1505) | g/cc | 0.89 |
| | | Vicat Soften Pt. (D-1525) | °C. | 60 |
| | | Tensile Strength At Break (515 K 6301) | kg/cm² | 320 |
| | | Elongation At Break (515 L 6301) | % | 700 |
| | | Mw/Mn | none | 2.0 |
| A-1085 | Mitsui | Melt Index (D-1238) | g/10 min (190° C.) | 1.4 |
| | | Density (D-1505) | g/cc | 0.885 |
| | | Vicat Soften Pt. (D-1525) | °C. | 58 |
| | | Tensile Break At Break (515 K 6301) | kg/cm² | 340 |
| | | Elongation At Break (515 K 6301) | % | 710 |
| | | Mw/Mn | none | 2.0 |
| A-0585 | Mitsui | Melt Index (D-1238) | g/10 min. (190° C.) | 0.5 |
| | | Density (D-1505) | g/cc | 0.88 |
| | | Melting Point | °C. | 67 |
| | | Vicat Softening Pt. (D-1525) | °C. | 62 |
| | | Tensile Strength at Break (5.5 K 6301) | kg/cm² | 400 |
| | | Elongation at Break (5.5 K 6301) | % | 650 |
| | | Mw/Mn | none | 2.05 |
| 4011 | Exxon | Melt Index (D-1238) | g/10 min. (190° C.) | 2.2 |
| | | Density (D-1505) | g/cc | 0.885 |
| | | Melting Point (Exxon Method) | °C. | 66 |
| | | Vicat Softening Pt. (D-1525) | °C. | 70 |
| | | Elongation at Break (D-638) | % | 2800 |

Although not essential in the practice of this invention, it may be desirable to cross-link (one or more layers if the film is the multilayer type) the inventive film for improved abuse and/or puncture resistance and other physical characteristics. This for example may be accomplished by irradiation using high energy electrons, ultra violet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60 ° C. may be employed.

Processwise, irradiation can be applied to the entire film if the monolayer type, or if the multilayer type to a single substrate layer such as the first outer layer and prior to biaxial orientation if the primary multilayer film is prepared by coating lamination. This type of irradiative cross-linking is for example described in the aforementioned U.S. Pat. U.S. 3,741,253. Alternatively, if the film is multilayer and simultaneously coextruded, it may be preferable to irradiate the entire multilayer film, and for maximum efficiency this should be done after biaxial orientation (i.e. post irradiation) at a dosage level below about 8 MR, as for example described in U.S. Pat. No. 4,714,638.

Cross-linking may also be accomplished chemically through utilization of peroxides, as is well known to those of skill in the art. A general discussion of cross-linking can be found at pages 331 to 414 of volume 4 of the Encyclopedia of Polymer Science and Technology, Plastics, Resins, Rubbers, Films published by John Wiley & Sons, Inc. and copyrighted in 1966. This document has a Library of Congress Catalog Card Number of 64–22188.

Unless otherwise noted, the resins utilized in the present invention are generally commercially available in pellet form and, as generally recognized in the art, may be melt blended or mechanically mixed by well known methods using commercially available equipment including tumblers, mixers or blenders. Also, if desired, well known additives such as processing aids, slip agents, antiblocking agents, pigments, etc., and mixtures thereof may be incorporated into the film, by blending prior to extrusion. The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the EVA-ethylene alpha-olefin plastomer-VLDPE blends of the present invention, barrel and die temperatures, for example, may range between about 300° and about 350° F. However, depending upon such factors as other resins which may be employed, the manufacturing process used and particular equipment and other process parameters utilized, variations are expected. Actual process parameters including process temperatures will be set by one skilled in the art without undue experimentation.

Advantageously, a preferred embodiment of the inventive heat-shrinkable film will have a maximum extractable portion of 5.5 percent by weight of polymer in n-hexane at 50° C. for 2 hours as further described below. This 5.5 weight percent represents the desired maximum n-hexane extractable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film suitable for use in articles used in packing or holding food during cooking. The above maximum extractable values correspond to current limits for a class of resins intended for use in contact with food as set forth and described by the U.S. Food & Drug Administration in 21 CFR 177.1520 (which description is hereby incorporated in its entirety by reference).

In the following working examples, film characteristics were measured in accordance with the following procedures.

Free Shrink:

Free shrink at 90° C. was measured for each of the aforedescribed stretched sample strips as follows: Four test specimens were cut from a given sample of stretched film. The specimens were cut to 10 cm. in the stretched direction by about 1 cm. in the unstretched direction. Each specimen was completely immersed for 5 seconds in a 90° C. water bath. The distance between the ends of the shrunken specimen in the stretched direction was measured. The difference in the measured distance for the shrunken specimen and the original 10 cm. was multiplied by ten to obtain the percent of shrinkage in the stretched direction for the specimen. The shrinkage for the four specimens was averaged.

Shrink Force:

The shrink force of a film is that force or stress required to prevent shrinkage of the film and was determined from film samples taken from each film. Four film samples were cut 1 inch (2.54 cm) wide by 7 inches (17.8 cm) long in the machine direction and 1 inch (2.54 cm) wide by 7 inches (17.8 cm) long in the traverse direction. The average thickness of the film samples was determined and recorded and a strip chart recorder was calibrated at 0 gram and at 1,000 grams full scale load. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the results is obtained in grams per rail of film thickness (g/mil):

Shrink Force (g/mil)-$F/T$ wherein F is the force in grams and T is the average thickness of the film samples in mils.

Dynamic Puncture:

Measures the energy required to puncture a test sample with a sharp triangular metal point made to simulate a sharp bone end. A Dynamic Ball Burst Tester, Model No. 13-8, available from Testing Machines, Inc., Amityville, Long Island, N.Y., is used, and a ⅜ inch diameter conical tip is installed on the tester probe arm for use in this test procedure. The conical tip has the configuration of a right circular cone, and the angle between the cone axis and an element of the conical surface at the vertex is about 65°. Six test specimens approximately 4 inches square are prepared, a sample is placed in the sample holder, and the pendulum is released. The puncture energy reading is recorded. The test is repeated until samples have been evaluated. The results are calculated in cm-kg per mil of film thickness and averaged.

Hot Water Puncture:

Hot water puncture values are obtained by performing the hot water puncture test as follows. Water is heated to 95°±1° C. A ⅜ inch round wooden dowel is sharpened on one end to a conical point. This sharpened point has the configuration of a right circular cone, and the angle between the cone axis and an element of the conical surface at the vertex is about 60°. This sharp point is then rounded to a spherical tip of about 1/16 inch diameter. The wooden dowel is fastened to a wooden block so that the rounded point projects 1½ inches beyond the end of the wooden block. A specimen about 3 inches wide in the transverse direction (TD) and about ten inches long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material. The specimen and pointed dowel are quickly immersed into the hot water and a timer is started. The timer is stopped when the dowel point punctures the film specimen. The test procedure is repeated five more times with new 3 inch wide TD specimens from the given test sample material. The time required for penetration is recorded and then averaged for the six TD specimens.

Impulse Sealing Range:

This test was run to determine and compare the acceptable voltage ranges for impulse sealing the test films. A Sentinel Model 12-12AS laboratory sealer manufactured by Packaging Industries Group, Inc., Hyannis, Mass. was used. This impulse sealer was equipped with a replacement sealing ribbon for a Multivac AG100. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage was set a t the following conditions:

0.5 seconds impulse time (upper ribbon only)
  2.2 seconds cooling time
  50 psi (345 kPa) jaw pressure
  0.3 gallon per minute (1 liter per minute) cooling water flow One of the samples was folded in half for use in determining a minimum sealing voltage. This folding simulates folding which may inadvertently occur during conventional tube sealing operations. The folded sample which now had four layers was placed into the sealer and by trial and error the minimum voltage to seal the bottom two layers to each other was determined.

The maximum voltage was then determined for the two layer sample by placing it in the sealer and then activating the seal bar. The film sample was manually pulled with about 0.5 lbs. of force and the voltage which does not cause burn-through or significant distortion of the seal was determined.

Hot Water Seal Strength (HWSS):

As preparation for this test, the minimum and maximum temperatures (measured a t seal bar) are determined for which at least some of the bags are effectively sealed. This is the approximate temperature range for effective sealing. Then the approximate actual temperature is determined in some instances (also measured at the seal bar).

Hot water seal strength is a measure of the ability of a heat seal to withstand exposure to hot water under conditions of constrained shrink. Heat seals are made and a properly sized metal frame is placed inside the bag. A minimum of eleven bags are tested after aging for a period of 20 minutes. The time (in seconds) it takes for the seal to fail after immersion in 95° C. water is a measure of seal strength. The reported times are an average of all tested bags.

Haze: ASTM D-1003-52
Gloss: ASTM D-2457
Average Gauge: ASTM D-2103

EXAMPLE 1

One embodiment of the invention is a monolayer biaxially oriented heat shrinkable film of the type used to package poultry. A series of tests were performed in which such films were prepared with commercial equipment and using various blends of plastomer, VLDPE and EVA to compare film properties. The control film was a VLDPE-EVA blend without plastomer. The measured properties were free shrink and optical characteristics i.e., haze and gloss.

All Example 1 films were prepared by the double or trapped bubble method as broadly described in the aforementioned Pahlke U.S. Pat. No. 3,456,044. That is, the resin blends were prepared by tumble mixing and fed to an extruder having a 3 ½ inch diameter screw with a 24/1 L/D ratio. A 60 mm die diameter was used to extrude the primary tube of about 2¼ inches diameter and about 0.032 inch wall thickness at a rate of about 15.5 feet/minute. The extruder barrel and die temperatures ranged from about 325° to 360° F. (150°–170° C.). The primary tube was cooled to 90° F. and then reheated to about 180° F. for biaxial orientation and cooled. The machine direction (MD) orientation was about 5 to 1, and the transverse direction orientation was about 3.5 to 1. Draw point temperature, bubble cooling rates and orientation rates were adjusted to maximize bubble stability. The biaxially oriented heat shrinkable tubular films of about 12 inches in diameter had about 2 mils wall thickness.

Control film 1 (without plastomer) was not a single sample but a composite of fifty five samples of this commercially employed formulation. In the first series of tests comprising samples 1 through 8A, the plastomer was Exxon's Exact type 4011, the VLDPE was Dow's type XU 61520 and the EVA was Exxon's type LD 7010 having a vinyl acetate content of 10 wt. %, a melting point of 98° C. and a melt index of 0.19. The additive package was Ampacet 10919 (a fluoroelastomer) and 50914 (ethylene bis-oleamide) and comprised 5 wt. % of the total film weight. All formulation weight percentages in summary Table I and succeeding tables are based on the three major component total as 100% (either VLDPE-EVA or plastomer-VLDPE-EVA). The control film sample 1 comprised 62.1% VLDPE and 37.9% EVA. The plastomer content of the films was progressively increased from 15.8 wt. % (samples 2 and 3) to 36.8 wt. % (sample 6–8A). At the same time for the same or approximately equivalent plastomer content formulations, the relative proportions of VLDPE and EVA were varied. The blow ratio (final tube/primary tube diameter) was 3.21 for samples 1–8A. By inspection of Table I it will be seen that samples 6, 7 and 8A of the first test series comprise embodiments of the invention, so that Example 1 provides a direct comparison between the present films and other formulations in terms of shrink and optical properties.

In the second series of tests comprising samples 8B through 10, the plastomer and VLDPE were the same as in the first series. However, the EVA was DuPont's type 3135-X having a vinyl acetate content of 12 wt. %, a melting point of 95° C. and a melt index of 0.35. Also, the blow ratio for these samples was increased to 3.72. Only sample 8B also having a plastomer content of 36.8 wt. % represents an embodiment of the invention. Since the sample 8B formulation has the same three component percentages as invention embodiment sample 6, the effect of EVA vinyl acetate wt. % on optical properties may be determined by comparison (recognizing the effect of different blow ratios on shrink).

Referring now to Table I, both the first series and the second series of rests demonstrate that the invention film samples 6, 7, 8A and 8B each have significantly higher free shrink values than the control film sample 1 and formulations with lower plastomer content and higher EVA content. The optical properties of these invention embodiments were at least as favorable as any of the other formulation films and significantly better than the control film 1 and 15.8 wt. % plastomer film samples 2 and 3.

A comparison of invention samples 6 and 8B indicates that higher vinyl acetate content in the EVA adversely affects the film optical properties, i.e. increases haze and decreases gloss. This is probably because vinyl acetate is less compatible than ethylene with the VLDPE and plastomer constituents in this particular formulation. However, even the optical properties of sample 8B are superior to the optical properties of the 15.8% plastomer formulation samples 2 and 3. In view of the foregoing, a preferred embodiment of this invention employs EVA with vinyl acetate content less than 18 wt. % and most preferably less than about 15 wt. % to insure the most desirable optical properties in the film.

The optical characteristics of three component invention samples 6, 7 and 8A may be compared with a two component biaxially oriented heat shrinkable monolayer film comprising a blend of the same types of EVA and plastomer but no VLDPE. The average opticals for the three sample films of the invention were 4.2% haze and 82.5% gloss. In contrast, the opticals for a two component blend monolayer comprising 59.2% EVA and 40.8% plastomer were 33.0% haze and 27.3% gloss. Since VLDPE is not known in the art for imparting good optical properties to films, it was surprising that with about the same plastomer % in the formulation, a three component blend film containing VLDPE in addition to EVA has strikingly better optical properties compared to a two component blend film with only EVA.

TABLE IA

| | Monolayer Film Properties | | | | |
|---|---|---|---|---|---|
| Sample No. | Plastomer[1] wt. % | VLDPE[2] wt. % | EVA[3] wt. % | Shrink @90° C. MD/TD (%) | Haze/ Gloss % (H.U.)** |
| 1 | 0 | 62.1 | 37.9 | 32/35 | 8.0/63.0 |
| 2 | 15.8 | 26.3 | 57.9 | 48/52 | 6.5/67.4 |
| 3 | 15.8 | 36.8 | 47.4 | 48/49 | 4.9/71.2 |
| 4 | 23.2 | 47.4 | 29.4 | 52/54 | 3.9/84.4 |
| 5 | 29.4 | 47.4 | 23.2 | 51/52 | 4.4/82.4 |
| 6* | 36.8 | 26.4 | 36.8 | 60/56 | 4.2/83.0 |
| 7* | 36.8 | 36.8 | 26.4 | 59/55 | 3.8/83.1 |
| 8A* | 36.8 | 26.4 | 36.8 | 63/58 | 4.7/81.3 |
| 8B* | 36.8 | 26.4 | 36.8 | 58/63 | 4.5/80.4 |
| 9 | 26.3 | 31.6 | 42.1 | 50/52 | 4.0/82.0 |
| 10 | 31.6 | 21.0 | 47.4 | 57/61 | 5.0/79.2 |

[1]Plastomer was Exxon's EXACT 4011 ethylene alpha olefin
[2]VLDPE was Dow's ATTANE XU 61520
[3]For samples 1–8A, EVA was Exxon's LD 7010
For samples 8B–10, EVA was DuPont's 3135-X
*Invention embodiment
**Hunter units of gloss at 45°

The hot water seal strength of three nonirradiated samples from Table IA was also measured: control sample 1, Wilhoit invention sample 2 and present invention sample 6. Minimum and maximum seal temperatures were measured and the actual seal temperatures were not measured but are between the extremes. The results are reported in Table IB, and show that the hot water seal strength for sample 6 is slightly superior to sample 2 (60+ sec. vs. 52.6 sec.). Moreover, the minimum seal temperature of sample 6 is lower than the other two samples (320° vs. 340° F.), indicating that seals can be made with less heat and power.

TABLE IB

| Monolayer Film Hot Water Seal Strength | | | |
|---|---|---|---|
| Sample No. | 1 | 2 | 6 |
| Minimum Temp (°F.) | 340 | 340 | 320 |
| HWSS (sec.) | 19.8 | 9.2 | 11.4 |
| Maximum Temp (°F.) | 425 | 450 | 320 |
| HSWW (sec.) | 60+ | 52.6 | 60+ |

Example 2

Another embodiment of this invention comprises a biaxially oriented heat shrinkable film comprising a first outer layer, an oxygen barrier core layer, and a second outer layer with the outer layer on opposite sides of the core layer. The aforedescribed three component blend comprises at least one of the first and second outer layers. In this Example 2, three layer films were prepared including a control film sample 11 comprising a two component blend of 26.2% EVA and 73.8% VLDPE used in the outer layers. Sample 12 first and second outer layers comprised a three component blend of 56.5% EVA, 27.8% VLDPE and 20.7% plastomer in the first and second outer layer, so is an embodiment of the aforereferenced Wilhoit invention. Sample 13 first and second outer layers comprised a three component blend of 36.1% EVA, 27.8% VLDPE and 36.1% plastomer, so is an embodiment of this invention. In each instance the EVA was the aforedescribed Exxon type LD 701, the VLDPE was the aforedescribed Dow type XU 61520 and the plastomer was the aforedescribed Exxon Exact type 4011. In each instance the oxygen barrier core layer comprised 75% vinylidene chloride-methyl acrylate copolymer and 25% vinylidene chloride-vinyl chloride copolymer. Also, the additive package for each sample was Ampacet Corporation type 100031 comprising 3 wt. % 3M FX 4920 processing aid, 1.25% oleamide and the balance LLDPE. The processing aid component itself comprised 66.7 wt. % polyethylene glycol, 30% fluorocarbon elastomer and 3.3 inorganic additives.

All of the Example 2 multilayer films were prepared in the same general manner as the Example 1 monolayer films by the double bubble method. However, all three layers were simultaneously coextruded, cooled and then reheated for biaxial orientation. The first outer layer (which became the inner layer of the extruded tube) was fed to an extruder having a 3 ½ inch screw diameter with an L/D ratio of 20/1. The second outer layer (which became the outer layer of the extruded tube) was a 2 ½ inch screw with an L/D ratio of 20/1. The core layer was extruded with a 2 ½ inch screw diameter having an L/D ratio of 20/1. A 60 mm diameter die was used to extrude the primary tube of about 2 13/16 inches diameter and about 0.030 inch wall thickness. The extruder barrel and die temperature ranged from about 300° to 350° F. (149°–182° C.) and the output was about 170 lbs/min. The primary tube was cooled to 90° F. and then reheated to about 180° F. for biaxial orientation and cooled. The MD orientation ratio was about 4.8 to 1, and the TD orientation ratio was about 4.6 to 1. The biaxially oriented tube had a wall thickness of about 2.1 mils comprising a 0.6 mil thick inner layer, a 1.3 mil thick outer layer, and a 0.2 mil thick core barrier layer.

It will be apparent from the foregoing that the properties of samples 11–13 may be compared. Their free shrink, shrink force and optical characteristics were measured and are summarized in Table J. The latter demonstrates that the shrink and optical properties of invention film sample 13 are substantially better than either control sample 11 (no plastomer) or sample 12 (20.7% plastomer).

TABLE J

Nonirradiated Multilayer Film

| Sample No. | Outer Layers | Shrink @ 90° C. MD/TD (%) | Shrink Force @ 90° C. MD/TD (g/mil) | Haze % | Gloss H.U. |
|---|---|---|---|---|---|
| 11 | 26.2% EVA 73.8% VLDPE | 28/41 | 140/185 70/95 | 7.5 | 69.7 |
| 12 | 51.5% EVA 27.8% VLDPE 20.7% plastomer | 43/49 | 136/152 77/95 | 6.1 | 76.8 |
| 13* | 36.1% EVA 27.9% VLDPE 36.1% plastomer | 49/54 | 123/146 81/95 | 4.0 | 87.6 |

*Invention embodiment

EXAMPLE 3

A series of tests were performed using the same three major components as in Example 2 and with the same three layer film type including an oxygen barrier core layer, wherein the plastomer content of the outer layers was adjusted to various levels in the 21.1–57.9% range. The VLDPE content was maintained at 26.3% for all formulations, so the EVA content was adjusted in the 52.6–15.8% range. The purpose of these tests was to demonstrate the effect of increasing plastomer and decreasing EVA content on optical properties, free shrink percent, and hot water seal strength of the biaxially oriented heat shrinkable film.

All of the Example 3 multilayer films were prepared in the same manner as the Example 2 films using commercial equipment. The first outer layer (which became the inner layer of the extruded tube) was fed to an extruder having a 2 ½ inch screw diameter with an L/D ratio of 24/1. The second outer layer (which became the outer layer of the extruded tube) was fed to an extruder with a 2 ½ inch screw with an L/D ratio of 20/1. A 60 mm diameter die was used to extrude the primary tube of about 1.8 inches diameter and about 0.032 inch wall thickness. The extruded barrel and die temperature ranged from about 300° to 350° F. (149–180° C.) and the output was about 100 lbs/hr. With one exception, each formulation was run continuously for one hour. Preferred embodiment sample 18 formulation was run continuously for a period of fifteen hours. The primary tube was cooled to 70° F. and then reheated to about 170° F. for biaxial orientation and cooled. The MD orientation ratio was about 4.8 to 1, and the TD orientation ratio was about 4.2 to 1. The biaxially oriented tube had a wall thickness of about 2.1 mils comprising a 1.2 mil thick inner layer, a 0.7 mil thick outer layer and a 0.2 mil thick core barrier layer.

Nine different film formulations were prepared and their measured properties are summarized in Table K as plastomer-containing samples 15–22. Sample 23 was the control with no plastomer and the formulation was the same as Example 2 control film sample 11. In general, samples 15–20 were relatively easy to prepare but sample 21 (52.6% plastomer) and sample 22 (57.9% plastomer) were difficult to orient because the high plastomer content resulted in a relatively soft film and great difficulty in maintaining a stable bubble during the orientation step. Properties were measured on both nonirradiated samples and the same samples after irradiation at 3.75 MR (used for hot water seal strength).

For the nonirradiated samples and referring first to the optical characteristics, the haze % of invention film samples 18 (36.8% plastomer) and 19 (42.1% plastomer) was significantly lower than samples with lower or higher percent plastomer content. Likewise, the gloss of these same invention film samples 18 and 19 were significantly higher than samples with lower or higher percent plastomer content. The optical properties of invention samples 18 and 19 were substantially better than 0% plastomer content sample 23. With respect to shrink properties, all plastomer-containing samples were generally in the same range with a slight increase in percent shrink with progressively increasing plastomer content. However, as previously noted the optical properties for samples having 31.6% or lower plastomer content and 47.4% or higher plastomer content were inferior. Also, the higher plastomer content—films were more difficult to manufacture on a continuous production basis. The shrink properties of invention samples 18 and 19 were substantially higher than 0% plastomer control sample 23.

The hot water seal strength data on irradiated film indicates that the seal retention times for invention sample 18 were substantially longer than the lowest plastomer content sample 15, but all samples would be considered commercially acceptable from this standpoint. Control sample 23 had the highest seal retention time because of its high VLDPE content.

This Example 3 and Table K demonstrate the unexpected advantages of the inventive film wherein the plastomer comprises between about 33 and about 45 wt. % (preferably between about 33 and about 38%), the VLDPE comprises between about 24 and about 38 wt.% (preferably between about 25 and about 30%), and the EVA comprises between about 28 and about 40 wt. % (preferably between about 33 and about 38%) of the three component blend. Sample 18 also illustrates a preferred embodiment of the film which is irradiated, has at least 50% shrink in both the machine and transverse directions at 90° C., haze less than about 6%, gloss of at least about 77, and hot water seal strength of at least 15 seconds at 95° C. With respect to HWSS, the actual measurement was 26.2 seconds when sealed at 470° F., so the hot water seal strength clearly exceeds the aforementioned preference threshold.

TABLE K

| Sample[1] No | 15 | 16 | 17 | 18* | 19* | 20 | 21 | 22 | 23 |
|---|---|---|---|---|---|---|---|---|---|
| Formulation (wt. %) of outer layers | 52.6% EVA 26.3% VLDPE 21.1% | 47.4% EVA 26.3% VLDPE 26.3% | 42.1% EVA 26.3% VLDPE 31.6% | 36.8% EVA 26.3% VLDPE 36.8% | 31.6% EVA 26.3% VLDPE 42.1% | 26.3% EVA 26.3 VLDPE 47.4% | 21.1% EVA 26.3% VLDPE 52.6% | 15.8% EVA 26.3% VLDPE 57.9% | 26.2% EVA 73.81% VLDPE 0% |

Effect of Plastomer Concentration[2]

TABLE K-continued

| | Effect of Plastomer Concentration[2] | | | | | | | | |
|---|---|---|---|---|---|---|---|---|---|
| Sample[1] No | 15 | 16 | 17 | 18* | 19* | 20 | 21 | 22 | 23 |
| | plastomer | plastomer | plastomer | plastomer | plastomer | plastomer | plastomer | plastomer | plastomer |
| Haze (%) | 6.5 (6.6) | 5 (5.8) | 5.5 (5.8) | 4.5 (5.5) | 4.0 (5.1) | 5.8 (5.1) | 6.0 (6.2) | 5.5 (6.7) | 7.5 |
| Gloss H.U. | 75.5 (72.8) | 79.9 (78.5) | 79.2 (79.2) | 83.0 (77) | 82.5 (79.2) | 80.1 (79.5) | 78.0 (77.8) | 82.0 (74.5) | 69.7 |
| Shrink @ 90° C. MD/TD (%) | 52/57 (45/51) | 51/57 (45/51) | 52/58 (46/52) | 54.5/58.5 (50/54) | 55/60 (45/52) | 57.5/61.5 (51/53) | 55/59 (52/56) | 57.5/60.5 (52/55) | 28/41 |
| Hot Water Seal Strength[2] | | | | | | | | | |
| Minimum Seal Temp (°F.) | 375 | 375 | 375 | 375 | 375 | 375 | 350 | 375 | 350 |
| HWSS (sec) | 7.6 | 19.2 | 12.2 | 20.2 | 11.8 | 19.6 | 22.4 | 10.4 | 46.8 |
| Maximum Seal Temp (°F.) | 577 | 572 | 572 | 572 | 572 | 572 | 572 | 572 | 572 |
| HWSS (sec) | 19.2 | 58.4 | 33.6 | 28.2 | 32.6 | 56.0 | 60.0 | 57.0 | 60 |
| Actual Seal Temp (°F.) | 470 | 470 | 470 | 470 | 470 | 470 | 460 | 470 | 460 |
| HWSS (sec) | 9.7 | 16.9 | 28.3 | 26.2 | 18.7 | 44.2 | 60 | 60 | 60 |

[1]All films were three layers with the indicated formulation as the two outer layers. The oxygen barrier core layer was 75% vinylidene chloride-methyl acrylate copolymer and 25% vinylidene chloride-vinyl chloride copolymer.
[2]All values in parenthesis are after post irradiation at 3.75 MR
*Invention embodiment

EXAMPLE 4

Irradiation is commonly used to broaden the impulse heat sealing temperature range of biaxially oriented heat shrinkable thermoplastic film and also improve the impact resistance properties of the film. A disadvantage of irradiative treatment is that it typically reduces the free shrink properties of the film.

A series of tests were performed to demonstrate the effects of irradiation on the properties of Example 2—type films. In these tests the same extrusion and biaxial orientation system was used as described in connection with Example 2, and thereafter the 12 inch diameter heat shrinkable tubes of about 2.0 mils wall thickness were irradiated (i.e., post-irradiated) at dosage of about 3.15 MR. That is, the entire tube was treated at about the same level after orientation in manner generally described in U.S. Pat. No. 4,714,638. The tubes were then longitudinally cut to form a flat sheet and formed into bags about 9 ½ inches long and 11 inches wide by a commercial-type side impulse-sealing bag machine at a rate of about 84 bags/minute. Various properties of the film and the side-sealed bags manufactured therefrom were measured and are summarized in Table L.

TABLE L

| | Irradiated Film and Side-Sealed Bags | | | | |
|---|---|---|---|---|---|
| Sample No. | Units | 24 | 25 | 26 | 27* |
| Formulation in outer layers | Wt. % | (1) | 26.6% EVA 73.4% VLDPE | 51.54% EVA 27.8% VLDPE 20.7% Plastomer | 36.1% EVA 27.8% VLDPE 36.14% Plastomer |
| Irradiation Dose | Mrads | 3.15 | 4.0 | 3.15 | 3.15 |
| Film Thickness | mil | 2.1 | 2.4 | 2.05 | 2.19 |
| Shrink @ 90° C. MD/TD | % | 36/46 | 25/36 | 42/48 | 46/52 |
| Shrink Force @ 90° C. MD/TD | g/mil | 121/130 | 140/185 | 137/56 | 119/127 |
| Haze | % | 7.0 | 8.0 | 6.1 | 6.3 |
| Gloss | H.U. | 75.0 | 72.0 | 79.8 | 79.2 |
| Melt Flow Index (inner Layer) | dg/min | 0.3 | 0.2 | 1.19 | 1.91 |
| Impulse Seal Range | volts | 27–46 | 30–47 | 31–43 | 31–38 |
| Bag Seal | | | | | |
| Min. Temp. | °F. | 325 | — | 325 | 325 |
| Max. Temp. | °F. | 525 | — | 450 | 400 |
| Typical Temp. | °F. | 450 | — | 390 | 360 |
| Hot Water Seal Strength @ 95° C. | | | | | |
| Minimum | Seconds | 2.0 | — | 11 | 16 |
| Maximum | Seconds | 20.0 | — | 40 | 45 |
| Average | Seconds | 8.3 | — | 16.5 | 28.8 |

*Invention embodiment
[1]100% EVA (one outer layer)
20.0% EVA and 80.0% VLDPE (other outer layer)

Table L shows that physical and optical properties of invention sample 27 are substantially superior to prior art control sample 25 (EVA-VLDPE blend in both outer layers), sample 24 (100% EVA in one outer layer and EVA-VLDPE blend in other outer layer), and Wilhoit invention sample 26 because the former seals at a substantially lower temperature and its hot water seal strength is substantially higher. Compared to the Wilhoit invention sample 26, invention sample 27 has significantly higher shrink and the optical properties are comparable. Table L also shows that the impulse sealing properties of invention sample 27 are substantially superior to prior art control sample 24, and demonstrates a preferred embodiment of the invention.

EXAMPLE 5

In this series of tests, the Example 4 type films were manufactured in the same commercial-type extrusion-biaxial orientation-irradiation system for a continuous period of 24 hours, physical and sealing properties were measured on the film products. These values are summarized in Table M.

TABLE M

Long Term Performance of Irradiated Films

| Film Sample No. | Units | 28 | 29 | 30 | 31* |
|---|---|---|---|---|---|
| Formulation in outer layers | Wt. % | (1) | 73.8% EVA 26.2% VLDPE | 51.5% EVA 27.8% VLDPE 20.7% plastomer | 36.1% EVA 27.8% VLDPE 36.1% plastomer |
| Dose | Mrad | 3.3 | 4.0 | 4.0 | 4.0 |
| Tensile Strength, MD/TD | psi | 10700/ 11627 | 11880/ 12602 | 12145/ 12473 | 12385/ 12915 |
| Elongation @ break, MD/TD | % | 170/189 | — | 182/196 | 198/218 |
| Shrink @ 90° C. MD/TD | % | 39/47 | 20/32 | 40/46 | 47/52 |
| Dynamic Puncture | cmkg/mil | 1.97 | 2.2 | 1.97 | 2.4 |
| Melt Flow Index (inner layer) | dg/min | 0.16 | 0.15 | 0.18 | 0.23 |
| Impulse Seal | volts | 28/46 | 40/50 | 31–48 | 30–44 |

*Invention embodiment
(1)100% EVA (one outer layer)
20% EVA and 80% VLDPE (other outer layer)

Referring now to Table M, it shows that all measured properties of the invention film sample 31 are significantly better than prior art samples 28 and 29. The invention sample 31 also demonstrated superior physical and sealing properties to the Wilhoit invention sample 30. However, it should be noted that the latter's shrink and impulse seal properties are superior to prior art samples 28 and 29 and experience has confirmed that the commercial production waste rate for the sample 30 type film is substantially lower than the prior art type film sample 29.

EXAMPLE 6

Still another series of tests were performed to demonstrate the effect of EVA with high vinyl acetate content on the optical and shrink properties of oxygen barrier-type multilayer films of the present invention. In particular, nonirradiated and irradiated biaxially oriented heat shrinkable three layer films of the previously described type comprising about 36–37% plastomer, 26% VLDPE and 36–37% EVA were prepared in the previously described manner and compared in terms of optical and shrink properties. Two EVA types were used: the aforedescribed Exxon type LD 701 having a vinyl acetate content of 10 wt. % (sample 32) and DuPont type 3165X having a vinyl acetate content of 18 wt. % (sample 33A). The plastomer was Exxon Exact type 4011 and the VLDPE was Dow Attane XU61520. Films 32 and 33 were similar to each other in layer thicknesses and also similar to the aforedescribed Examples.

The optical and shrink properties of these films are summarized in Table N.

TABLE N

| | Effect of High Vinyl Acetate EVA | | |
|---|---|---|---|
| Sample No. | 32 | 33A | 33B |
| Formulation of Outer layers (wt. %) | 36.8% EVA (10% VA) 26.4% VLDPE 36.8% | 37.5% EVA (18% VA) 26.0% VLDPE 36.5% | 51.5% EVA (18% VA) 27.8% VLDPE 20.7% |
| | plastomer | plastomer | plastomer |
| Haze (%) | 4.5 (6.5)* | 6.1 (7.3)* | (24.0)* |
| Gloss H.U. | 83.0 (76.1)* | 74.0 (70.6)* | (37.2)* |
| Shrink @ 90° C. MD/TD (%) | 54.5/58.5 (50/54)* | 58/62 (52/55)* | 47/53 |

*Values in parenthesis are after post irradiation of the film at 3.75 MR

Table N shows that although the high VA content sample 33 provided excellent shrink, its optical properties were poor in comparison to low VA sample 31. Accordingly, the former does not provide one of the improvements of this invention—improved optical properties. Irradiation adversely affected the optical and shrink properties of both films but the opticals for invention sample 32 were still superior to sample 32.

It will be recalled that in Example 1 (monolayer films), higher VA content sample 8B (using 12 wt. % EVA) had poorer optical properties than corresponding 10% VA content sample 6. However, the former's optical properties are considered acceptable for commercial packaging and sample 8B is a monolayer film embodiment of this invention. With respect to multilayer films, it is possible that when used in different formulations of this invention, EVA with as high as 18 wt. % vinyl acetate content may provide satisfactory optical properties and such formulations are contemplated as part of the invention. In view of sample 8B, it is likely that a 12% vinyl acetate type EVA in a multilayer film of this invention would provide acceptable optical properties. Notwithstanding the foregoing, relatively lower VA-content EVA such as less than about 15 wt. % vinyl acetate are preferred to achieve superior optical properties. Moreover, the use of EVA having less than about 12 wt. % is especially preferred from this standpoint.

The importance of using at least about 33 wt. % plastomer to realize good optical properties is illustrated by comparing the aforedescribed sample 33A with sample 33B. The latter is the same type of film as sample 33A, except that it contains only 20.7% plastomer and relatively higher EVA content (51.5 wt. %). Yet its optical properties are vastly inferior to sample 33A.

EXAMPLE 7

A further test was performed to demonstrate the effect of using a metallocene-derived material with a relatively low melting point as the VLDPE in the three component blend of a multilayer oxygen barrier type film for purposes of the present invention. More particularly, a three layer film (sample 34) was prepared in the aforedescribed manner with outer layers comprising 36.5% plastomer, 37.5% EVA and 26.0% of the aforedescribed Exxon Exact type 3033 VLDPE having a density of 0.900. The EVA was the aforedescribed Exxon type LD701 and the plastomer was the aforedescribed Exxon Exact type 4011 having a melting point of 66° C. The control film was the same sample 32 from Example 6 having the same three component proportions as Example 33 but using a Ziegler-Natta type VLDPE (Dow's XU 61520) with a 121° C. melting point and 0.912 density. Films 32 and 34 were similar to each other in layer thicknesses and also similar to the aforedescribed examples.

The optical, shrink and hot water seal strength properties of these two films are compared in Table O. The latter shows that the free shrink of metallocene-derived VLDPE sample 34 was exceptional, and its haze was similar to invention control sample 32. However, the gloss of sample 34 was undesirably low relative to control sample 32. The reason for this is not known but may have been due to the relatively soft nature of Exxon Exact 3033 type VLDPE and resultant scratching during the extrusion step, or perhaps incompatibility with the other two major constituents of the blend. However, it was surprising that the hot water seal strength of this sample 34 was acceptable, notwithstanding the use of a relatively low melting VLDPE. Accordingly, Example 34 demonstrates that relatively low melting point metallocene-derived VLDPE materials may be used in the practice of this invention, either alone or in blends with higher melting point VLDPE materials.

TABLE O

Effect of Mettalocene-Derived VLDPE

| Sample No. | 32 | 34 |
| --- | --- | --- |
| Type VLDPE | Dow Attane XU 61520.01 | Exxon Exact 3033 |
| Haze (%) | 4.5 (6.15)* | 4.6 (6.4)* |
| Gloss H.U. | 83.0 (76.1)* | 76.2 (71)* |
| Shrink @ 90° C. MD/TD (%) | 54.5/58.5 (50/54)* | 63/67 (54/58)* |
| Hot Water Seal Strength* | | |
| Minimum Seal Temp (°F.) | 375 | 375 |
| HWSS (sec) | 20.2 | 25.8 |
| Maximum Seal Temp (°F.) | 572 | 572 |
| HWSS (sec) | 28.2 | 60.0+ |
| Actual Seal Temp (°F.) | 470 | 470 |
| HWSS (sec) | 26.2 | 60+ |

*Values in parenthesis and hot water seal strengths are after post irradiation of the film at 3.75 MR.

Summarizing the foregoing Examples 1–7, they demonstrate that an improved biaxially oriented heat shrinkable film is provided comprising a three component blend of between about 24 and about 38 wt. % VLDPE, between about 28 and about 40 wt. % EVA, and between about and 45 wt. % ethylene alpha-olefin plastomer. This film provides improved optical properties, shrink and hot water seal strength, and is suitable for packaging processed meat. With respect to these ranges, if the plastomer content is below about 33 wt. %, the film shrink is not sufficiently high and the optics (% haze and gloss) are not improved relative to prior art films. If the plastomer content is greater than about 45 wt. %, the good optical properties of the film diminish and the film is difficult to biaxially orient. The plastomer content is preferably between about 33 and about 38 wt. % as a balance of these foregoing considerations.

If the VLDPE content is less than about 24 wt. % the hot water seal strength is not adequate for impulse heat sealed, evacuated and heat shrunk bags fabricated from the film and storing processed meat. If the VLDPE content is greater than about 38 wt. % the film % shrink is not sufficiently high. The VLDPE content is preferably between about 25 and about 30 wt. % as a balance of these foregoing considerations.

If the EVA content is less than about 28 wt. %, the film shrink is too low and the same is true if the EVA exceeds about 40 wt. %. A preferred EVA content is between about 33 and about 38 wt. %.

In a further preferred embodiment the film is irradiated, has at least about 50% shrink in both the machine and transverse directions at 90° C., haze of less than about 6%, gloss of at least about 77, and hot water seal strength of at least about 15 seconds at 95° C.

EXAMPLE 8

The aforedescribed present invention film sample 31 and Wilhoit invention film sample 30 were used to package smoked half-ham products in a field test in a customer's plant by customer personnel using commercial equipment operated at commercial production rates. The test bags were 8 ½ inches long ×12 inches wide and the product was packaged with the original thermoplastic film casing and using a W. R. Grace evacuator curved seal bar machine operated at 65–67 volts for impulse sealing. The machine speed was 48–50 pieces per minute and following the evacuation-sealing operation the packages were shrunk in a conventional shrink tunnel using hot water spray.

Five hundred bags of each type bag were run. The Wilhoit invention film sample 30 had four leakers for a rebag rate of 0.8%. Of the four leakers, three were at seal folds and one was a heal break. The present invention film sample 31 had thirteen leakers for a rebag rate of 2.6%. Of the leakers, nine were at seal folds, two were due to operator error, one was due to an unacceptably low vacuum, and one was due to a heal break. Present invention sample 31 appeared to be more difficult to impulse heat seal through the folds. Production personnel in the plant commented that the package appearance and performance of both type bags looked good.

EXAMPLE 9

Another field test was performed which was very similar to Example 8, using the same two formulation types of bags (11 inches long ×12 inches wide) to package smoked half-ham products. The packaging system was the same except that the product-containing packages were not heat-shrunk. Two hundred fifty bags of each type were run. The Wilhoit invention film sample 30 had a rebag rate of 2.0% and the present invention film sample 31 had a rebag rate of 1.3%.

EXAMPLE 10

In still another series of field tests, bags formed from the present invention film sample 31 were used to package ham in a customer's plant (and by its personnel) using commercial equipment operated at normal production rates. In addition to the invention bags, two other commercially employed bag types were used for packaging under the same conditions on the same equipment. One type was the aforedescribed control bag sample 24 comprising a three layer film of 100% EVA (10% vinyl acetate) and 0.25 melt index as the inner layer, a blend of 20.0% EVA (same type as inner layer) and 80.0% VLDPE (Dow XU 61520) as the outer layer, and an oxygen barrier core layer comprising 75% vinylidene chloride-methyl acrylate-25% vinylidene chloride-vinyl chloride. The other type bag was W. R. Grace Cryovac Division type B 541 T comprising at least five layers. The bags were 8 inches long ×11 inches wide.

The failures (requiring rebagging) can be classified as operator/machine related and bag related. The latter are the only failures which can be directly attributed to the bags. The rebagging performance from this field test series is summarized in Table P.

TABLE P

| | Comparative Field Tests | | |
| --- | --- | --- | --- |
| | Type Bag | | |
| Rebags | Control Sample 24 | Invention Sample 31 | Cryovac B 541 T |
| Operator/Machine Related | | | |
| Torn Seal[(1)] | 10 | 20 | 8 |
| Low Vacuum | 0 | 3 | 6 |
| Incomplete Seal | 1 | 2 | 10 |
| Bag Related | | | |
| Fold In Seal | 0 | 0 | 16 |
| Heel Break | 0 | 0 | 1 |
| Total Rebags | 11 | 25 | 41 |
| Total Bags Run | 251 | 489 | 429 |
| Operator/Machine Related Rebag Rate (%) | 4.4 | 5.1 | 5.6 |
| Bag Related Rebag (%) | 0.0 | 0.1 | 4.0 |
| Total Rebag Rate (%) | 4.4 | 5.1 | 9.6 |

[(1)]Torn seals are due to dull/malfunctioning cut-off knives.

Table P shows that the invention film performs at least as well as prior art commercially available film for shrink packaging processed meats.

The above-described embodiments only serve to illustrate the invention and its advantages and should not be interpreted as limiting since further modifications of the disclosed invention will be apparent to those skilled in the art. All such modifications are deemed to be within the scope of the invention as defined by the following claims.

What is claimed is:

1. A biaxially oriented heat-shrinkable film comprising a three component blend of very low density polyethylene (VLDPE), ethylene vinyl acetate (EVA) and ethylene alpha-olefin plastomer copolymer of density below about 0.90 g/cm$^3$ and having a melting point between about 55° C. and about 85° C. as major components, wherein said VLDPE comprises between about 24 and about 38 wt. %, said EVA comprises between about 28 and about 40 wt. % with a vinyl acetate content of less than about 18 wt. %, and said plastomer comprises between about 33 and about 45 wt. % of said three component blend.

2. A biaxially oriented heat-shrinkable film according to claim 1 wherein, said film is a monolayer.

3. A biaxially oriented heat-shrinkable film according to claim 1 wherein said blend comprises at least one layer of a multilayer film.

4. A biaxially oriented heat-shrinkable film according to claim 1 wherein said VLDPE has a melting point of at least about 115° C.

5. A biaxially oriented heat-shrinkable film according to claim 1 wherein said EVA has a vinyl acetate content of less than about 15 wt. %.

6. A biaxially oriented heat-shrinkable film according to claim 1 wherein said VLDPE comprises between about 25 and about 30 wt. % of said three component blend.

7. A biaxially oriented heat-shrinkable film according to claim 1 wherein said EVA comprises between about 33 and about 38 wt. % of said three component blend.

8. A biaxially oriented heat-shrinkable film according to claim 1 wherein said plastomer comprises between about 33 and about 38 wt. % of said three component blend.

9. A biaxially oriented heat-shrinkable film according to claim 1 wherein said VLDPE comprises between about 25 and about 30 wt. %, said EVA comprises between about 33 and about 38 wt. %, and said plastomer comprises between about 33 and about 38 wt. % of said three component blend.

10. A biaxially oriented heat-shrinkable film according to claim 3 wherein said multilayer film comprises at least three layers including an oxygen barrier core layer between a first outer layer and a second outer layer, and said three component blend comprises at least one of said first and second outer layers.

11. A biaxially oriented heat-shrinkable film according to claim 3 wherein said multilayer film comprises three layers including an oxygen barrier core layer between a first outer layer and a second outer layer, and said first and second outer layers each comprise an identical said three component blend.

12. A biaxially oriented heat-shrinkable film according to claim 1 which is irradiated.

13. A biaxially oriented heat-shrinkable film according to claim 11 which is irradiated.

14. An irradiated biaxially oriented heat-shrinkable film according to claim 1 which has at least about 50% shrink in both the machine and transverse directions at 90° C., haze of less than about 6%, gloss of at least about 77 Hunter Units and hot water seal strength of at least 15 seconds at 95° C.

15. In a method for manufacturing a biaxially oriented heat-shrinkable film wherein a primary tube is extruded, cooled, reheated and stretched in the machine direction and inflated in the transverse direction by internal gas to form a bubble, then collapsed and withdrawn as biaxially oriented thinner film: the improvement comprising forming the primary tube from a three component blend of major constituents consisting of very low density polyethylene (VLDPE), ethylene vinyl acetate (EVA) and ethylene alpha-olefin plastomer copolymer of density below about 0.90 g/cm$^3$ wherein the VLDPE comprises between about 24 and about 38 wt. %, said EVA comprises between about 28 and about 40 wt. %, and said plastomer comprises between about 33 and about 45 wt. % of said three component blend.

16. An irradiated biaxially oriented heat-shrinkable bag formed from film comprising a three component blend of very low density polyethylene (VLDPE), ethylene vinyl acetate (EVA) and ethylene alpha-olefin plastomer copolymer of density below about 0.90 g/cm$^3$ as major components, wherein said VLDPE comprises between about 24 and about 38 wt. %, said EVA comprises between about 28 and about 40 wt. %, and said plastomer comprises between about 33 and about 45 wt. % of said three component blend.

* * * * *